United States Patent
Jeon et al.

(10) Patent No.: US 11,983,518 B2
(45) Date of Patent: May 14, 2024

(54) DEVICE, SYSTEM AND A METHOD FOR REPROGRAMING ELECTRONIC CONTROL UNIT

(71) Applicant: RESEARCH & BUSINESS FOUNDATION SUNGKYUNKWAN UNIVERSITY, Suwon-si (KR)

(72) Inventors: Jae Wook Jeon, Suwon-si (KR); Jun Young Moon, Suwon-si (KR); Do Yeon Kim, Suwon-si (KR); Min Hee Jo, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 462 days.

(21) Appl. No.: 17/134,900

(22) Filed: Dec. 28, 2020

(65) Prior Publication Data
US 2021/0216294 A1    Jul. 15, 2021

(30) Foreign Application Priority Data

Jan. 10, 2020    (KR) .................. 10-2020-0003535

(51) Int. Cl.
*G06F 8/60*    (2018.01)
*H04L 12/40*    (2006.01)

(52) U.S. Cl.
CPC .......... *G06F 8/60* (2013.01); *H04L 12/40143* (2013.01); *H04L 2012/40215* (2013.01); *H04L 2012/40273* (2013.01)

(58) Field of Classification Search
CPC ............... G06F 8/60; H04L 12/40143; H04L 2012/40215; H04L 2012/40273
See application file for complete search history.

(56) References Cited

U.S. PATENT DOCUMENTS

| | | | |
|---|---|---|---|
| 8,027,352 B2* | 9/2011 | Noumi | H04L 12/4625 370/401 |
| 2001/0032288 A1* | 10/2001 | Matsuura | G06F 8/65 711/163 |
| 2007/0276994 A1* | 11/2007 | Caulkins | G06F 3/061 711/113 |
| 2019/0058611 A1* | 2/2019 | Maeda | H04L 12/40 |
| 2019/0116157 A1* | 4/2019 | Kishikawa | G06F 21/645 |

(Continued)

FOREIGN PATENT DOCUMENTS

| KR | 10-2013-0046903 A | 5/2013 |
|---|---|---|
| KR | 10-2017-0127585 A | 11/2017 |

OTHER PUBLICATIONS

Korean Office Action issued on Dec. 18, 2020 in counterpart Korean Patent Application No. 10-2020-0003535 (30 pages in Korean).

*Primary Examiner* — S. Sough
*Assistant Examiner* — Stephen D Berman
(74) *Attorney, Agent, or Firm* — NSIP Law (57) ABSTRACT

A device for reprogramming an electronic control unit (ECU) is configured to store controller area network (CAN) frames in a temporary storage medium, transmit the CAN frames to a main storage medium when the temporary storage medium receives a certain capacity, and minimize the time required for reprogramming. The device for reprogramming the ECU may be linked to an artificial intelligence module, a robot, an augmented reality (AR) device, a virtual reality (VR) device, and a device related to 5G service.

11 Claims, 6 Drawing Sheets

(56) References Cited

U.S. PATENT DOCUMENTS

| | | | | |
|---|---|---|---|---|
| 2019/0163380 A1* | 5/2019 | Shimizu | ............ | G06F 3/0643 |
| 2019/0384522 A1* | 12/2019 | Yun | ............ | B60W 60/00 |
| 2021/0075735 A1* | 3/2021 | Tsuji | ............ | H04L 47/13 |
| 2022/0415097 A1* | 12/2022 | Kodama | ............ | B60R 16/02 |

* cited by examiner

DEVICE, SYSTEM AND A METHOD FOR REPROGRAMING ELECTRONIC CONTROL UNIT

CROSS-REFERENCE TO RELATED APPLICATION

This application is based on and claims priority under 35 U.S.C. 119 to Korean Patent Application No. 10-2020-0003535, filed on Jan. 10, 2020, the contents of which are all hereby incorporated by reference herein in their entirety.

BACKGROUND

Field

The present disclosure relates to a device, system, and method for reprogramming an electronic control unit (ECU, vehicle controller).

Description of Related Art

Recently, as vehicles become more advanced and vehicle controllers are multifunctional, the size of software of an electronic control unit (ECU, vehicle controller) is increasing rapidly.

Meanwhile, reprogramming means downloading the software for the vehicle to the ECU, and as the size of the software for the vehicle increases, the reprogramming time has been increased in proportion to this.

If the reprogramming time is longer, the time taken to produce the vehicle becomes longer, and engineers' work efficiency may decrease due to the increased production time, and generally the production of the vehicle decreases.

Accordingly, there is an increasing need for a reprogramming device or method capable of more quickly processing reprogramming for the ECU.

SUMMARY

The present disclosure aims to solve the above-described necessity and/or problem.

A device, system, and method for reprogramming an ECU according to the present disclosure preferentially stores controller area network (CAN) frames in a temporary storage medium, transmits the CAN frames to a final storage medium when the temporary storage medium receives a certain capacity, and minimizes the time required for reprogramming.

A device for reprogramming an electronic control unit (ECU) according to an embodiment of the present disclosure includes a main node connected to a main PC, a sub-node connected to a first ECU, a main node management unit configured to set a communication environment of the main node, and a CAN frame generation unit configured to convert a first frame into a plurality of second frames when receiving the first frame including first data for reprogramming the first ECU through the main node, wherein the CAN frame generation unit sequentially transmits individual second frames included in the plurality of second frames to a first temporary storage medium included in the first ECU at a predetermined time interval.

When a storage space of the first temporary storage medium is full, the CAN frame generation unit may stop transmitting the second frame to the first temporary storage medium, and sequentially transmit the individual second frames to a second temporary storage medium included in a second ECU at a predetermined time interval.

When receiving a first signal from the first ECU, the CAN frame generation unit may stop transmitting the second frame to the second temporary storage medium, exclude the second frames transmitted to the first temporary storage medium before the transmission of the second frame to the first temporary storage medium is stopped, and sequentially transmit the second frames to be transmitted to the first temporary storage medium to the first temporary storage medium again at a predetermined time interval, and the first signal may be a signal indicating that the storage space of the first temporary storage medium is secured.

When transmitting all the second frames to be transmitted to the first ECU, the CAN frame generation unit may resume transmission of the second frame to the second temporary storage medium, exclude the second frames transmitted to the second temporary storage medium before the transmission of the second frame to the second temporary storage medium is stopped, and sequentially transmit the second frames to be transmitted to the second temporary storage medium to the second temporary storage medium again at a predetermined time interval.

A system for reprogramming an electronic control unit (ECU) according to another embodiment of the present disclosure includes a diagnostic unit configured to generate a first frame including first data for reprogramming the ECU, a gateway configured to receive the first frame from the diagnostic unit and convert the first frame into a plurality of second frames, and at least a plurality of ECUs configured to individually have a temporary storage medium, receive the second frames from the gateway, and primarily store them in the temporary storage medium, wherein the gateway sequentially transmits individual second frames included in the plurality of second frames to individual ECUs at a predetermined time interval.

The gateway may set the predetermined time interval in proportion to a capacity of the temporary storage medium divided by a predetermined size.

The temporary storage medium may be RAM.

The plurality of ECUs may include a first ECU and a second ECU, the first ECU may further include a first temporary storage medium and a first main storage medium, the second ECU may further include a second temporary storage medium and a second main storage medium, and the gateway may preferentially transmit the individual second frames to the first ECU.

When receiving a first signal from the first ECU, the gateway may stop transmitting the second frame to the second ECU, excludes the second frames transmitted to the first ECU before the transmission of the second frame to the first ECU is stopped, and sequentially transmit the second frames to be transmitted to the first ECU to the first ECU again at a predetermined time interval, and the first ECU may stores the second frames received after the stop in the first temporary storage medium, when the transmission of the second frame is stopped, the second ECU may move the second frames stored in the second temporary storage medium to the second main storage medium to secure a storage space of the second temporary storage medium, and the first signal may be a signal indicating that a storage space of the first temporary storage medium is secured.

When a storage space of the first temporary storage medium is full, the gateway may stop transmitting the second frame to the first ECU, and sequentially transmit the individual second frames to the second ECU at a predetermined time interval, and when the transmission of the second frame is stopped, the first ECU may move the second frames stored in the first temporary storage medium to the first main storage medium to secure the storage space of the first temporary storage medium.

When transmitting all the second frames to be transmitted to the first ECU, the gateway may resume transmission of the second frame to the second ECU, exclude the second frames transmitted to the second ECU before the transmission of the second frame to the second ECU is stopped, and sequentially transmit the second frames to be transmitted to the second ECU to the second ECU again at a predetermined time interval, and the second ECU may store the second frames received after the stop in the second temporary storage medium.

A method for reprogramming an electronic control unit (ECU) using a system for reprogramming the ECU according to another embodiment of the present disclosure includes receiving a first frame from a diagnostic unit by a gateway, converting the first frame into a plurality of second frames by the gateway, transmitting sequentially the second frames to a first ECU at a predetermined time interval by the gateway, receiving sequentially received second frames and primarily storing them in a first temporary storage medium by the first ECU, and moving and storing the second frames stored in the first temporary storage medium to a first main storage medium by the first ECU, wherein the first frame is an Ethernet frame including first data for reprogramming the ECU, and the second frame is a CAN frame.

The receiving sequentially received second frames and primarily storing them in a first temporary storage medium by the first ECU may further include stopping transmitting the second frame to the first ECU by the gateway when a storage space of the first temporary storage medium for storing the second frame is insufficient, and starting transmitting the second frame to a second ECU by the gateway.

The moving and storing the second frames stored in the first temporary storage medium to the first main storage medium by the first ECU may further include transmitting a first signal to the gateway when the first ECU moves the second frames stored in the first temporary storage medium to the first main storage medium to secure all the storage space of the first temporary storage medium, stopping transmitting the second frame to the second ECU by the gateway, and excluding the second frames transmitted to the first ECU before the transmission of the second frame to the first ECU is stopped, and sequentially transmitting the second frames to be transmitted to the first ECU to the first ECU again at a predetermined time interval by the gateway, wherein the first signal may be a signal indicating that the storage space of the first temporary storage medium is secured.

The device, system, and method for reprogramming the ECU according to the present disclosure reduce the time taken for reprogramming, thereby reducing the time to produce vehicles, and at the same time increasing the work efficiency of engineers, and consequently increasing the vehicle production.

DETAILED DESCRIPTION

Hereinafter, embodiments disclosed in the present disclosure will be described in detail with reference to the accompanying drawings, but the same or similar elements are denoted by the same reference numerals regardless of the reference numerals, and redundant descriptions thereof will be omitted. The suffixes "module" and "unit" of elements used in the following description are given or used interchangeably in consideration of only the ease of writing the specification, and do not themselves have a distinct meanings or roles. In addition, in describing the embodiments disclosed in the present disclosure, when it is determined that a detailed description of related known technologies may obscure the subject matter of the embodiments disclosed in the present disclosure, the detailed description thereof will be omitted. In addition, the accompanying drawings are for easy understanding of the embodiments disclosed in the present disclosure, the technical spirit disclosed in the present disclosure is not limited by the accompanying drawings, and are to be understood as including all modifications, equivalents, and alternatives included in the spirit and scope of the present disclosure.

While terms, such as "first", "second", etc., may be used to describe various elements, the elements are not limited by the above terms. The above terms are used only for the purpose of distinguishing one element from another element.

When an element is referred to as being "coupled" or "connected" to another element, it should be understood that other element may exist in the middle although the element may be directly coupled or connected to the other element. On the other hand, when an element is referred to as being "directly coupled" or "directly connected" to another element, it should be understood that there is no other element in the middle.

Expressions in the singular include plural expressions unless the context clearly indicates otherwise.

In the present disclosure, it should be understood that terms such as "comprises" or "have" are intended to designate the presence of features, numbers, steps, operations, elements, parts, or combinations thereof described in the specification, but do not preclude the possibility of the presence or addition of one or more other features, numbers, steps, operations, elements, parts, or combinations thereof.

Hereinafter, prior to describing a device, system and method for reprogramming an ECU according to the present disclosure with reference to the drawings, a term controller area network (CAN) used in the present disclosure will be briefly described.

The controller area network (CAN) may be referred to as CAN or CAN communication, and is a standard communication specification designed to allow microcontrollers or devices to communicate with each other without a host computer in a vehicle. The CAN communication is a message-based protocol, and in recent years, it is often used not only in vehicles, but also in industrial automation equipment or medical equipment. The controller area network (CAN) is a message-based network protocol of a non-host bus type used mainly for communication between controllers.

A CAN-data bus (CAN bus) is mainly used for data transmission between ECUs in automobile safety systems and convenience specification systems and control of information/communication systems and entertainment systems. The CAN transmits data through twisted or shielded two-stranded data lines.

The CAN operates according to a multi-master principle in which a plurality of ECUs perform a master function in a master/slave system.

(1) Characteristics of CAN-Data Bus (CAN Bus)
① CAN-data bus is divided into class B and class C.
② Maximum data transmission rate is 125 kBd in class B and 1 MBd in class C.
③ CAN-data bus system transmits data using two lines.
④ CAN class B has suitability against single line.
⑤ CAN class C does not have suitability against single line.

The suitability against single line means that even if one line is disconnected or shorted in the CAN-data bus system, the remaining one line accurately maintains the communication capability as it is. However, when the bus system is switched to single-line mode, interference resistance is no longer guaranteed. In some cases, malfunction may occur.

(2) Configuration of CAN-Data Bus (CAN Bus)

The CAN-data bus system is composed of at least two nodes, a CAN-low line, a CAN-high line, and at least two terminal resistors.

The nodes refer to a plurality of stations (e.g. ECUs) constituting the bus system.

The internal structure of a CAN bus node is the same as that of a LIN-bus node. High-quality controllers and transceivers are used to speed data transmission rates and apply different voltage levels to the bus line than on the LIN-data bus.

② Bus Line (CAN-High, CAN-Low)

When the dominant level (Udom) is formed in the CAN-high line by the transceiver of the node, the voltage of the line increases. At the same time, the voltage of the CAN-low line decreases. The logical value at this time is '0'. The two lines are either twisted together or shielded by a wire mesh.

The magnetic field generated by the two CAN-lines each time switching is canceled because the voltages change in opposite directions. Therefore, the two lines are electromagnetically neutral to the outside, and do not cause any external interference. That is, resistance to interference is guaranteed.

③ Terminal Resistors: Abschlusswiderstand

Terminal resistors connect a circuit between the CAN-high line and the CAN-low line. This prevents reflection from occurring in the CAN-bus line. The terminal resistors are mainly installed at the node.

The CAN-bus line without the terminal resistor may cause functional failure, especially in the CAN class C system. Therefore, in case of the failure, the terminal resistor must be checked first.

In the CAN class C system, the terminal resistor may be tested at the contact point of the CAN-line using a resistance measuring apparatus.

(3) CAN Operation Principle
① Multi-Master Principle

If information is not being transmitted/received through the bus line, each node (e.g. ECU) may transmit a message to the bus line according to the multi-master principle. When the plurality of ECUs want to transmit the message at the same time, the most important message is transmitted first through arbitration.

② Arbitration

It refers to a process of monitoring, managing, and arbitrating competing requests made by a plurality of processes or users for a single resource.

When the plurality of ECUs want to simultaneously transmit the message, access to the data bus line is controlled. The importance (priority) of the message is defined by an identifier (ID). The lower the identifier (ID) is, the higher the priority. The arbitration is also referred to as mediation.

Figure 1:
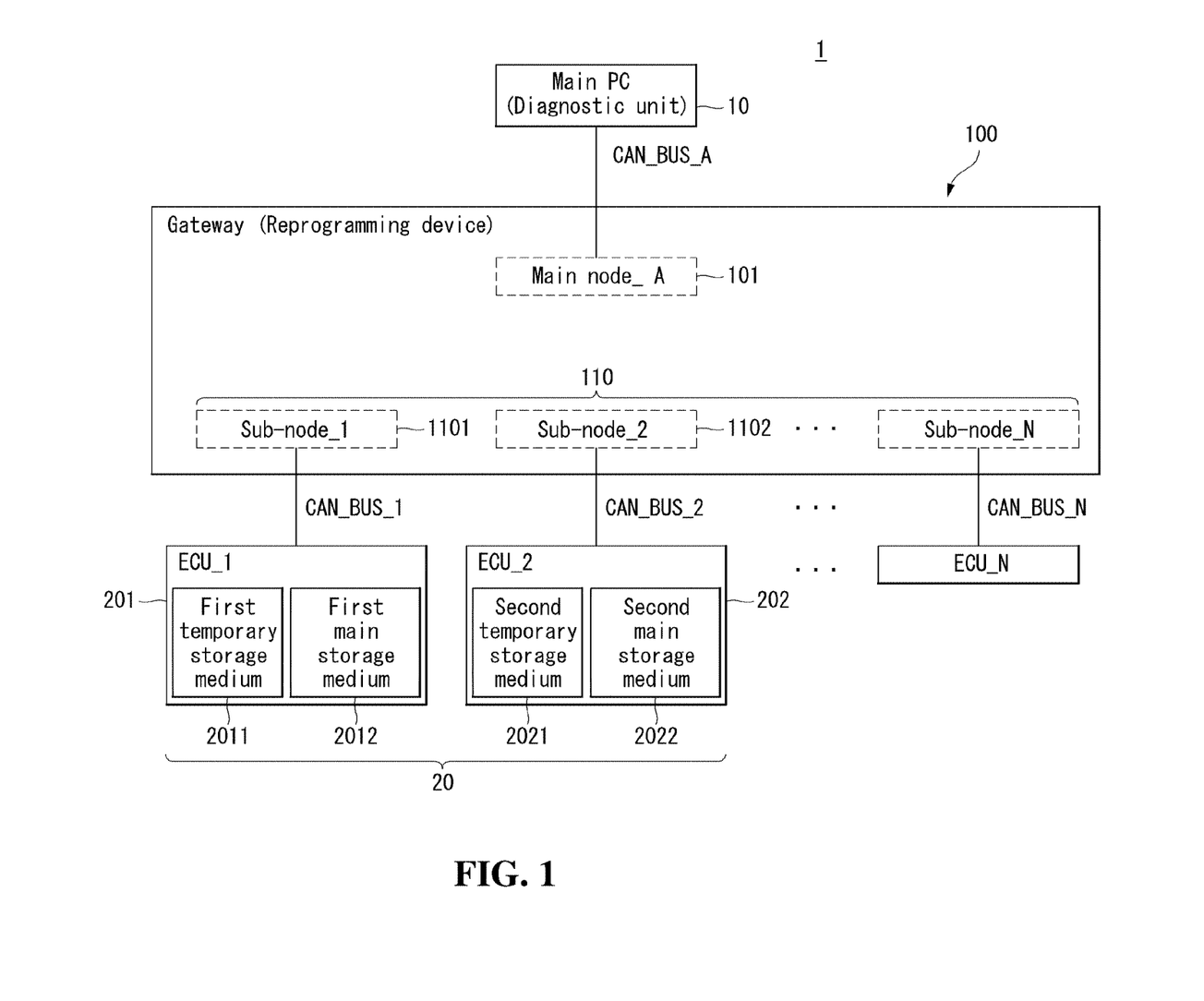
FIG. 1 is a block diagram illustrating a configuration of a system for reprogramming an ECU according to an embodiment of the present disclosure.

Hereinafter, a system 1 for reprogramming an ECU according to an embodiment of the present disclosure will be described in detail with reference to FIG. 1. FIG. 1 is a block diagram illustrating a configuration of a system for reprogramming an ECU according to an embodiment of the present disclosure.

Referring to FIG. 1, the system 1 for reprogramming an ECU according to an embodiment of the present disclosure (hereinafter, it is referred to as 'a reprogramming system') includes a main PC 10, a plurality of ECUs 20, and a gateway 100.

The main PC 10 may serve as a diagnostic unit that identifies whether individual ECUs are reprogrammed, and thus the main PC 10 may be referred to as the diagnostic unit. The diagnostic unit 100 may generate a first frame including reprogramming data and transmit it to the gateway 100. Here, the first frame is an Ethernet frame including the reprogramming data.

The plurality of ECUs 20 may include a first ECU 201 and a second ECU 202 by way of example. Referring to FIG. 1, the plurality of ECUs 20 may be configured to include N ECUs. However, in the following description, for convenience of description, it will be described as an example that the first ECU 201 and the second ECU 202 are included in the plurality of ECUs 20.

Meanwhile, as shown in FIG. 1, the first ECU 201 may further include a first temporary storage medium 2011 and a first main storage medium 2012, and the second ECU 202 may further include a second temporary storage medium 2021 and a second main storage medium 2022.

Meanwhile, the plurality of ECUs 20 may operate in the same environment as the main PC 10, and each of the plurality of ECUs 20 may perform a role of supporting each other's reprogramming.

For example, among the first ECU (ECU_1, 201), the second ECU (ECU_2, 202), . . . , an Nth ECU (ECU_N) if the first ECU (ECU_1, 201) is no longer receiving the reprogramming data during the reprogramming, instead of the first ECU (ECU_1, 201), the second ECU (ECU_2, 202) may receive the reprogramming data to start the reprogramming process.

Meanwhile, the gateway 100 may be referred to as a reprogramming device 100, in order that the gateway 100 is connected to each ECU (201, 202) to support the reprogramming, and include a plurality of different communication nodes corresponding to the corresponding ECU.

As shown in FIG. 1, the gateway 100 may include a main node_A 101 corresponding to the main PC 10, and include a plurality of sub-nodes 110 corresponding to the first ECU (ECU_1, 201) and the second ECU (ECU_2, 202). The plurality of sub-nodes 110 may include a sub-node_1 (1101)

corresponding to the first ECU (ECU_1, 201) and a sub-node_2 (1102) corresponding to the second ECU (ECU_2, 202).

And, the gateway 100 corresponding to the reprogramming device 100 in the present disclosure may transmit and receive signals with the main PC 10, the first ECU (ECU_1, 201), and the second ECU (ECU_2, 202), respectively through a communication interface of the main node_A 101, the sub-node_1 (1101), and the sub-node_2 (1102).

The gateway 100 may receive the first frame, which is the Ethernet frame, through the main node_A 101 from the main PC 10, and convert, generate, and output the first frame into a second frame, which is a CAN frame, through the plurality of sub-nodes 110.

For this, all the main node_A 101, the sub-node_1 (1101), and the sub-node_2 (1102) each support a CAN communication method. In this case, the main node_A 101 and the sub-nodes 110 are connected to the main PC 10, the first ECU (ECU_1, 201), and the second ECU (ECU_2, 202), respectively, through different communication lines, that is, different CAN buses.

Thus, the plurality of sub-nodes 110 may be connected to each of the ECUs 20, for example, the sub-node_1 (1101) and the sub-node_2 (1102), without colliding with each other, and output the CAN frame through each of the ECUs 20.

In particular, the main PC 10 may recognize that it is connected to one ECU 20 through the gateway 100, and convert the first frame including the reprogramming data into the second frame, which is the CAN frame, and transmit them to the plurality of ECUs 20, respectively, through the CAN buses connected to the sub-nodes 110.

In addition, the second frame, which is the CAN frame, may also be output to the main node_A 101 by the reprogramming device 100, and as a result, the same effect as the CAN frame being generated from the main PC 10 and transmitted to the individual ECU by the reprogramming device 100 occurs.

That is, the reprogramming device 100 may implement an environment such that the main PC 10 and the plurality of ECUs 20 are connected in a one-to-one (1:1) manner, respectively, on CAN_BUS.

Figure 2:
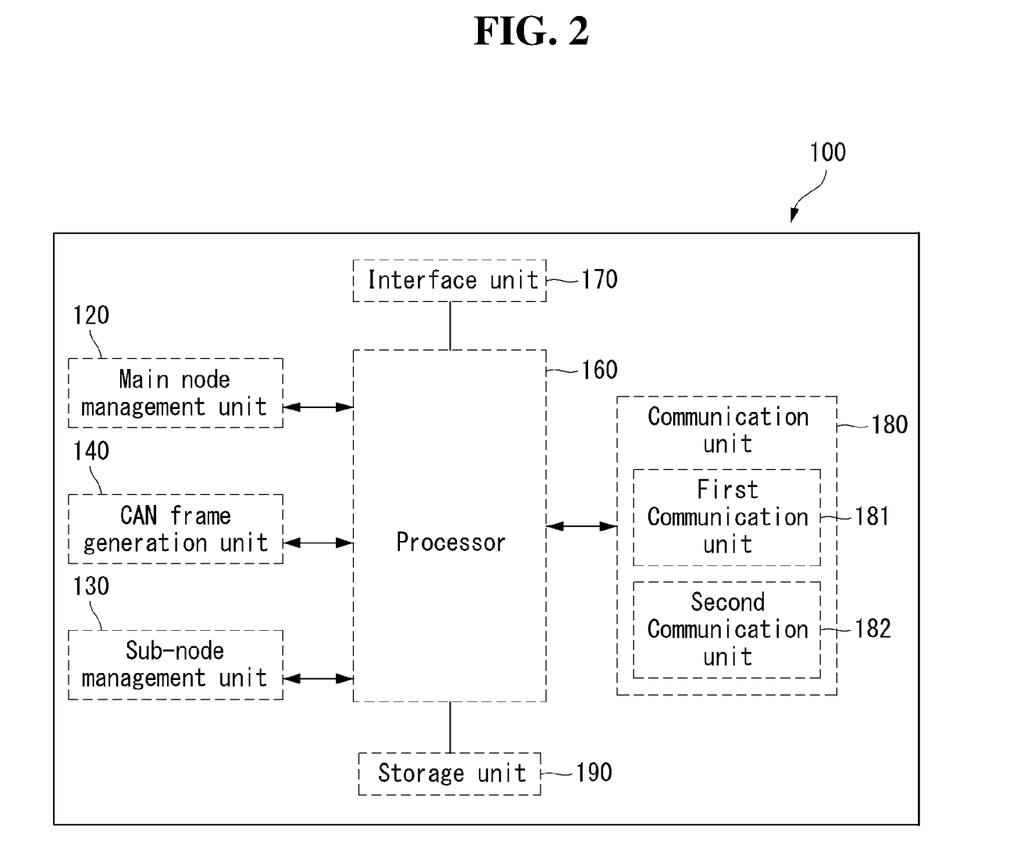
FIG. 2 is a block diagram of a device 100 for reprogramming an ECU according to an embodiment of the present disclosure.

Referring to FIG. 2, a detailed configuration of the reprogramming device 100 according to the present embodiment will be described. FIG. 2 is a block diagram of a device 100 for reprogramming an ECU according to an embodiment of the present disclosure.

As shown in FIG. 2, the device 100 for reprogramming the ECU according to the present disclosure (hereinafter, it is referred to as a reprogramming device) includes a processor 160, an interface unit 170, a communication unit 180, a storage unit 190, a main node management unit 120, a sub-node management unit 130, and a CAN frame generation unit 140.

The processor 160 controls the operation of each configuration included in the reprogramming device 100.

The interface unit 170 may be configured to receive a control command from an administrator, and include an interface device such as a touch screen from an input device such as a keyboard and a mouse. The administrator may manage the plurality of ECUs 20 to be reprogrammed through the interface unit 170.

For example, the interface unit 170 may receive information for setting a communication environment of each of the main node_A 101, the sub-node_1 (1101), and the sub-node_2 (1102) from the administrator. In addition, the interface unit 170 may output an operation state of the reprogramming device 100, or provide a reprogramming result to the administrator.

The communication unit 180 includes a first communication unit 181 providing the communication interface for transmitting and receiving signals between the main node_A 101 and the main PC 10 and a second communication unit 182 providing the communication interface for transmitting and receiving signals between the sub-node_1 (1101) and sub-node_2 (1102) and the corresponding first ECU 201 and second ECU 202, respectively.

The first communication unit 181 and the second communication unit 182 according to the present embodiment may provide the communication interface of the CAN communication method, and the first communication unit 181 and the second communication unit 182 are connected through different CAN buses.

Meanwhile, the second communication unit 182 may include a plurality of communication modules (not shown), and the plurality of communication modules may be connected to correspond to the plurality of ECUs 20 in a one-to-one (1:1) manner. In addition, the second communication unit 182 may be connected to the first ECU 201 and the second ECU 202 through the different CAN buses formed by the plurality of communication modules.

For example, the first communication unit 181 is connected to enable data communication with the main PC 10 through CAN_BUS_A shown in FIG. 1, and the second communication unit 182 is connected to enable data communication with each of the first ECU 201 and the second ECU 202 through CAN_BUS_1 and CAN_BUS_2 shown in FIG. 1.

The storage unit 190 serves to store information on the main node 101 and the sub-nodes 110. For example, the storage unit 190 may store node numbers for each of the main node 101 and the sub-nodes 110, information on the CAN buses connected to the corresponding node, and the like, and store communication node information for the main PC 10 connected to each node or each ECU, and the like.

In addition, the main node management unit 120 sets a communication environment of the main node 101, and manages signals transmitted and received with the main PC 10 through the main node 101. Accordingly, the main node management unit 120 may manage communication protocol information of the main node 101, communication node information of the main PC 10 connected to the main node 101, information of CAN_BUS_A, and the like.

The sub-node management unit 130 sets a communication environment of the sub-nodes 110 respectively corresponding to the plurality of ECUs 20 from the main PC 10, and manages signals transmitted and received with the plurality of ECUs 20 through the sub-nodes 110. Accordingly, the sub-node management unit 130 may manage communication protocol information of the sub-nodes 110, communication node information of the ECU 20 connected to each of the sub-nodes 110, and CAN_BUS information corresponding thereto.

When receiving the first frame, that is, the Ethernet frame, including the reprogramming data of the ECU from the main PC 10 through the main node 101, the CAN frame generation unit 140 converts it into a plurality of second frames, that is, a plurality of CAN frames.

In addition, the CAN frame generation unit 140 may output the received first frame to each of the sub-nodes 110. In addition, the CAN frame generation unit 140 transmits the converted second frames to the ECU 20 in order at regular time intervals through the CAN bus (CAN_BUS) connected to each sub-node 110. Here, when there are a plurality of ECUs to be transmitted, the second frame is transmitted according to the order of the ECUs.

For example, assuming that 100 CAN frames, that is, the second frames, generated by converting the first frame are generated, and assuming that the first ECU 201 and the second ECU 202 exist, the CAN frame generation unit 140 sequentially transmits the second frames from a first second frame to a 100th second frame. And, the CAN frame generation unit 140 preferentially transmits the second frames to the first ECU 201, when transmission of the second frame to the first ECU 201 is completed, the CAN frame generation unit 140 may be configured to transmit the second frame to the second ECU 202.

In addition, a predetermined time interval for determining a transmission interval of individual second frames may be set in proportion to a capacity of the temporary storage medium included in each ECU 20 divided by a predetermined size For example, if the size of the first temporary storage medium 2011 included in the first ECU 201 is 200 MB, by dividing this by 50, it may be set so that the individual second frame is transmitted from the gateway 100 to the first ECU 201 every 4 seconds.

Accordingly, the plurality of ECUs 20 may perform reprogramming using the reprogramming data included in the CAN frame transmitted from each connected sub-node 110.

Meanwhile, the CAN frame generation unit 140 may receive a response frame or a response message corresponding to the CAN frame transmitted to each ECU 20 through each sub-node 110 from the ECU 20. In this case, the gateway 100 checks a result of performing reprogramming for the plurality of ECUs 20 from the received response frame or response message. In this case, the CAN frame generation unit 140 may output a response frame or response message including the result of performing reprogramming of each ECU 20 to the main node 101.

In addition, the CAN frame generation unit 140 may output one response frame or response message obtained by collecting the result of performing reprogramming for the plurality of ECUs 20 to the main node 101, and output each response frame or response message including the result of performing reprogramming for each ECU 20 to the main node 101.

In addition, when the CAN frame generation unit 140 analyzes the response frame or the response message and determines that there is an ECU that has failed reprogramming as the result of performing reprogramming, the CAN frame generation unit 140 may output to the main node 101 including communication node information of the ECU that has failed reprogramming to the result of performing reprogramming. In this case, the communication node information of the ECU that has failed reprogramming may include information such as a communication node number capable of identifying the corresponding communication node. However, since the plurality of nodes are ECUs generated for the same purpose, they may have the same communication node ID, and thus communication node ID information may be excluded.

Meanwhile, the temporary storage medium may be composed of RAM, and the main storage medium may be composed of a flash memory.

The temporary storage medium according to the present disclosure is a temporary storage that preferentially stores the second frame, which is the CAN frame, and when a storage space of the temporary storage medium is full due to the storage of the second frames, the temporary storage medium moves and stores the second frames stored in the temporary storage medium to the main storage medium. When the converted and generated second frames are all stored in the main storage medium, the process of reprogramming the ECU is completed.

In addition, since the system 1 according to the present disclosure preferentially starts the transmission of the second frame to the first ECU 201, when a storage space of the first temporary storage medium 2011 included in the first ECU 201 is full, the system 1 controls the gateway 100 the transmission of the second frame to the first ECU 201 to be stopped. Otherwise, when the gateway 100 knows in advance information on the storage space of the first temporary storage medium 2011, and the storage space of the first temporary storage medium 2011 exceeds a certain level, the transmission of the second frame to the first ECU 201 may be stopped by itself.

And, when the transmission of the second frame is stopped, the first ECU 201 may move the second frames stored in the first temporary storage medium 2011 to the first main storage medium 2012 to secure the storage space of the first temporary storage medium 2011.

In addition, the gateway 100 may stop the transmission of the second frame to the first ECU 201, and sequentially transmit the second frame to the second ECU 202.

If the gateway 100 receives a first signal from the first ECU 201 while transmitting the second frame to the second ECU 202, the gateway 100 may stop the transmission of the second frame to the second ECU 202.

The first signal is a signal indicating that the storage space of the first temporary storage medium 2011 is secured, and a reprogramming data retransmission request signal for the gateway 100.

In this case, the gateway 100 excludes the second frames transmitted to the first ECU 201 before the transmission of the second frame to the first ECU 201 is stopped among the plurality of second frames, and sequentially transmits the second frames to be transmitted to the first ECU 201 to the first ECU 201 again at a predetermined time interval.

Then, the first ECU 201 stores the second frames received after the stop in the first temporary storage medium 2011 again, thereafter, the first ECU 201 moves and stores the second frames stored in the first temporary storage medium 2011 to the first main storage medium 2012, thus the first ECU 201 may complete the reprogramming process for the first ECU 201.

In addition, when the transmission of the second frame is stopped from the gateway 100, the second ECU 202 moves the second frames stored in the second temporary storage medium 2021 to the second main storage medium 2022 to secure a storage space of the second temporary storage medium 2022.

When transmitting all the second frames to be transmitted to the first ECU 201, the gateway 100 may resume the transmission of the second frame to the second ECU 202. In addition, the gateway 100 excludes the second frames transmitted to the second ECU 202 before the transmission of the second frame to the second ECU 202 is stopped among the plurality of second frames, and sequentially transmits the second frames to be additionally transmitted to the second ECU 202 to the second ECU 202 again at a predetermined time interval.

Then, the second ECU 202 stores the second frames received after the stop in the second temporary storage medium 2021 again, thereafter, the second ECU 202 moves and stores the second frames stored in the second temporary storage medium 2021 to the second main storage medium 2022, thus the second ECU 202 may complete the reprogramming process for the second ECU 202.

Hereinafter, a method of reprogramming an ECU using a reprogramming system according to an embodiment of the present method will be described in detail with reference to FIGS. 3 and 4.

Figure 3:
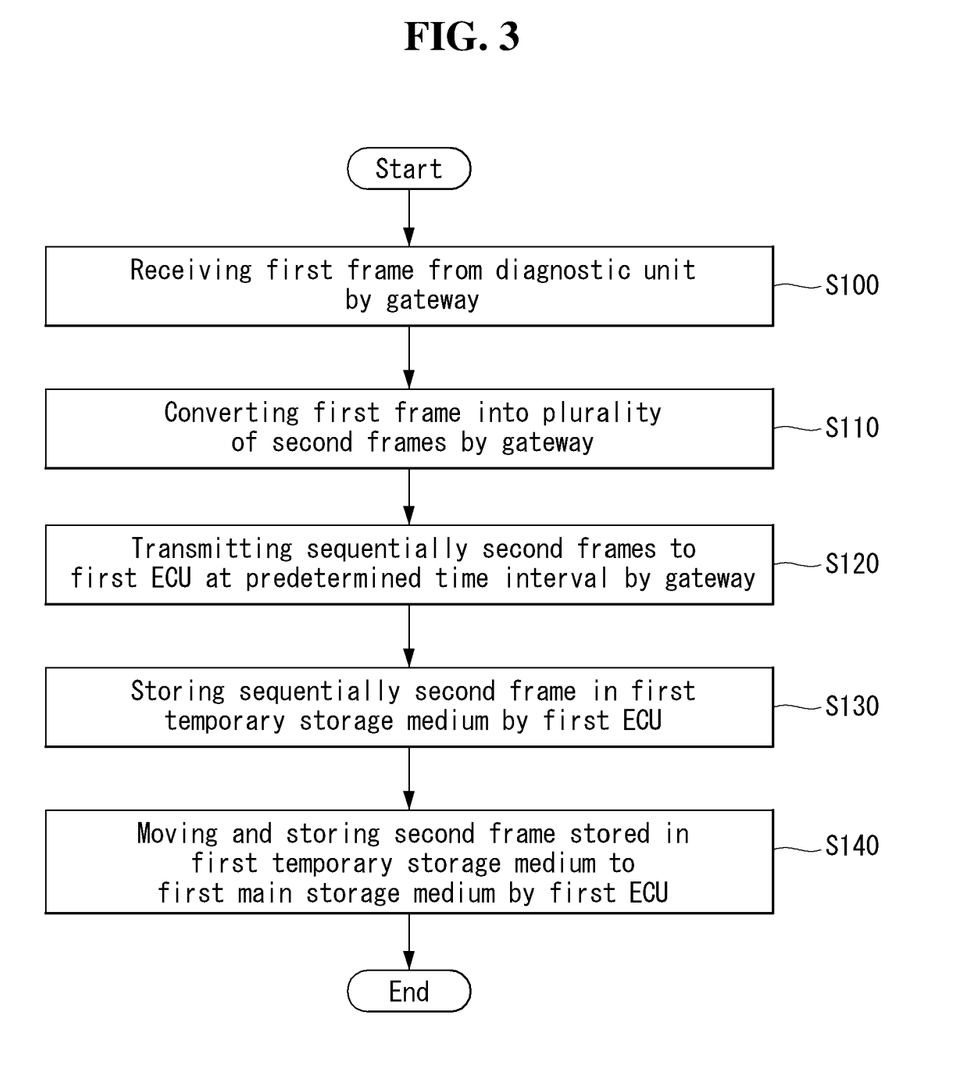
FIG. 3 is a flowchart illustrating a method of reprogramming an ECU using a reprogramming system according to an embodiment of the present method.

First, FIG. 3 is a flowchart illustrating a method of reprogramming an ECU using a reprogramming system according to an embodiment of the present method. Referring to FIG. 3, from a diagnostic unit 10, an Ethernet frame, that is, a first frame, including reprogramming data is generated and transmitted to a gateway 100 first (S100).

The gateway 100 that has received the first frame converts the first frame into a plurality of CAN frames, that is, a plurality of second frames (S110), and preferentially transmits the second frame to one ECU 20 determined to need reprogramming sequentially at a predetermined time interval (S120). As described above, it may be exemplified that the ECU 20 determined to need reprogramming includes the first ECU 201 and the second ECU 202.

In this case, an interval at which the gateway 100 transmits a CAN frame to one ECU 20 may be referred to as a time interval or 'Time_Interval'. Referring to FIG. 4, it may be confirmed an example of a process in which the gateway 100 transmits the CAN frame to one ECU 20. FIG. 4 is a diagram illustrating that a gateway 100 transmits a second frame to a first ECU 201 according to an embodiment of the present disclosure.

Figure 4:
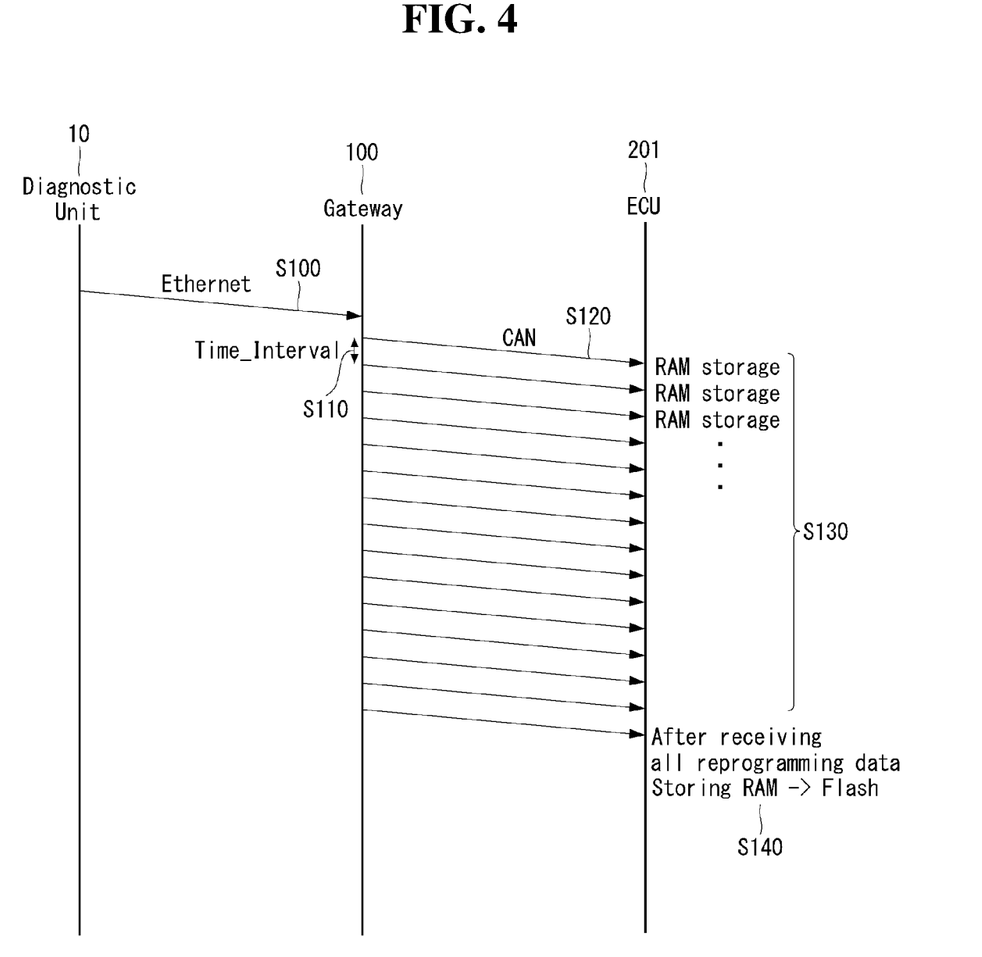
FIG. 4 is a diagram illustrating that a gateway 100 transmits a second frame to a first ECU 201 according to an embodiment of the present disclosure.

Referring to FIG. 4, the gateway 100 transmits CAN frames to the first ECU 201 one by one at a predetermined 'Time_Interval' (S120).

In this case, the criterion for determining 'Time_Interval' may be determined in proportion to a capacity limit value of the second frame that can be received to the ECU 20. However, it is not limited thereto.

Meanwhile, referring to FIG. 4 continuously, when receiving individual CAN frames from the first ECU 201, the individual CAN frames are first stored in RAM, which is the first temporary storage medium 2011 (S130). RAM is not a memory that finally stores the reprogramming data, but is a memory in which the reprogramming data stays for a while as an intermediate process.

The reason for using this RAM in the present embodiment is that the storage speed is much faster than that of the flash memory, which is the main storage medium, so that the overall time required for reprogramming of the ECU can be shortened.

Accordingly, 'Time_Interval' according to the present embodiment may be set shorter than that of the conventional one. Meanwhile, after all the reprogramming data has entered the RAM, which is the first temporary storage medium 2011, the first ECU 201 transmits the second frame including the reprogramming data from the RAM to the flash memory (S140).

In particular, in the present embodiment, since the gateway 100 does not need to wait in the step of transmitting the second frame from RAM to flash memory by the first ECU 201, and only needs to start transmitting the second frame, which is reprogramming data, to the second ECU 202, which is another ECU 20, the reprogramming time can be significantly reduced compared to the conventional ECU reprogramming method.

Meanwhile, since the RAM, which is the temporary storage medium, generally has a smaller storage space than the flash memory, when the reprogramming data is too large, another reprogramming method is required. Therefore, in the following, a method of reprogramming the ECU will be described with reference to FIGS. 5 and 6 when the reprogramming data is too large and the space to store the reprogramming data is insufficient for the RAM.

Figure 5:
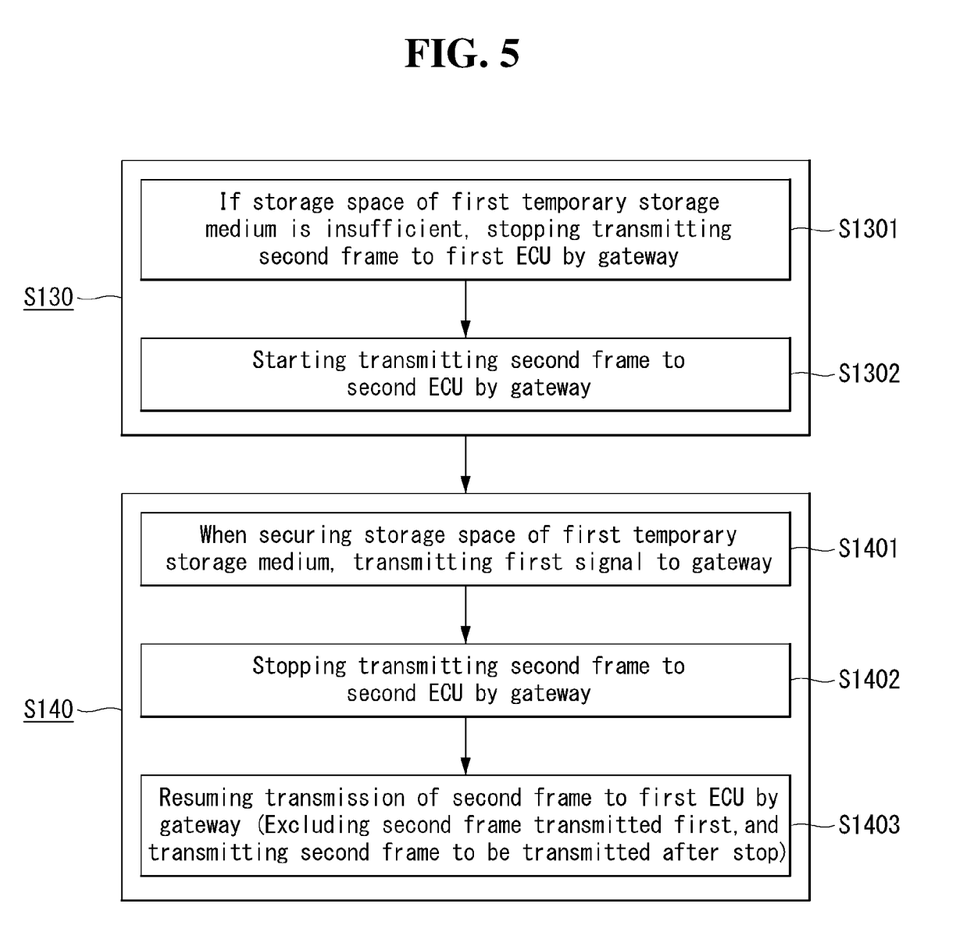
FIG. 5 is a flowchart illustrating a method of securing a storage space in a temporary storage medium by a system 1 according to another embodiment of the present disclosure.

First, referring to FIG. 5, when there is insufficient storage space in the temporary storage medium, a method of reprogramming the ECU by the system 1 according to another embodiment of the present disclosure can be confirmed. FIG. 5 is a flowchart illustrating a method of securing a storage space in a temporary storage medium by the system 1 according to another embodiment of the present disclosure.

Referring to FIG. 5, in the method of reprogramming an ECU according to another embodiment of the present disclosure, step S130 may further include an additional step.

In step S130, the first ECU 201 sequentially stores the second frames in the first temporary storage medium 2011, and if the storage space of the first temporary storage medium is insufficient, the gateway 100 may detect this. Further, the gateway 100 may stop transmitting the second frame to the first ECU 201 (S1301).

At the same time, the first ECU 201 may transmit the second frame including the reprogramming data from the RAM to the flash memory (S140).

In addition, the gateway 100 may transmit the second frame to the second ECU 202 (S1302).

Thereafter, when the first ECU 201 moves the second frames stored in the first temporary storage medium 2011 to the first main storage medium 2012 to secure all of the storage space of the first temporary storage medium 2011, the first ECU 201 may transmit the first signal to the gateway 100 (S1401).

As described above, the first signal is a signal indicating that the storage space of the first temporary storage medium 2011 is secured, and is a reprogramming data retransmission request signal for the gateway 100.

Figure 6:
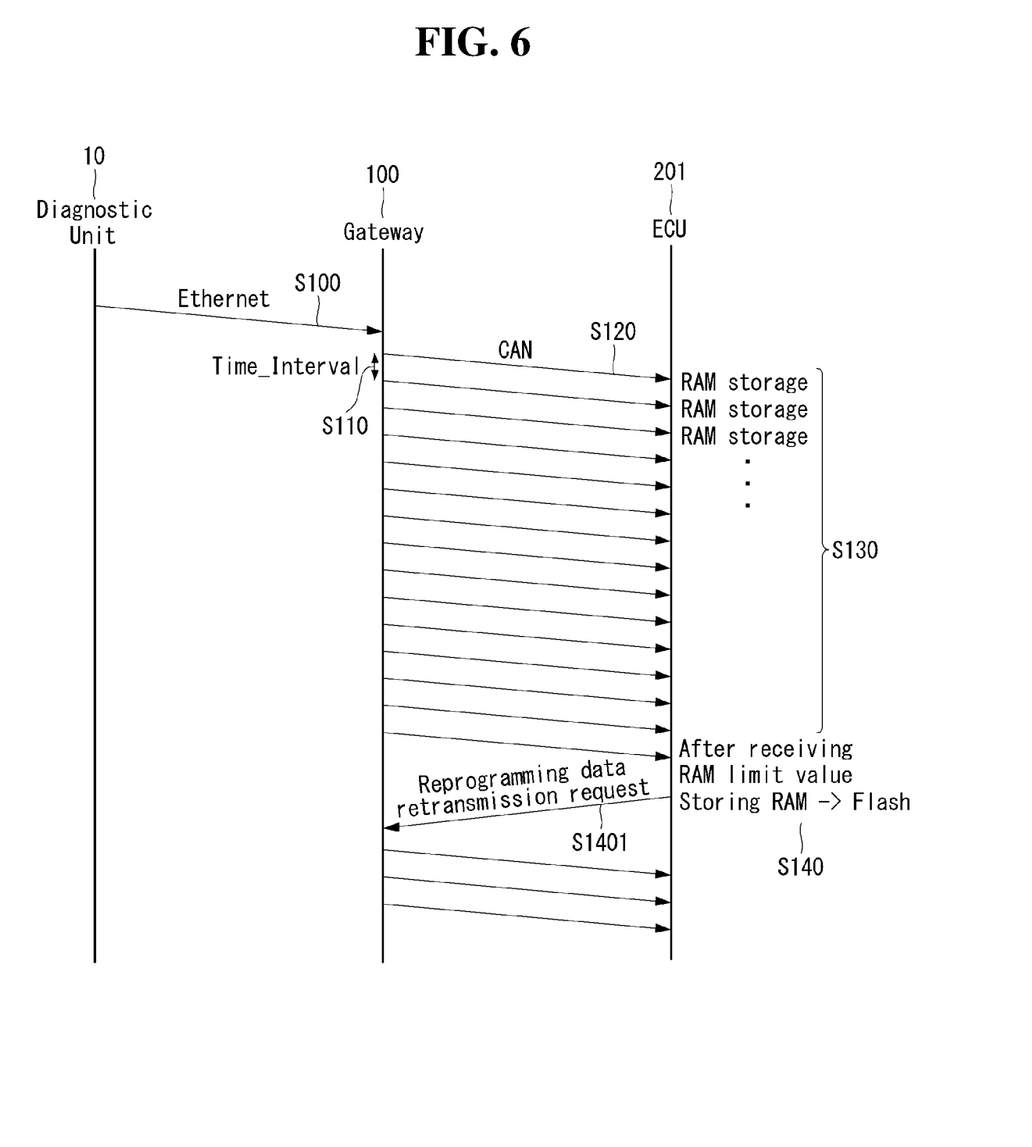
FIG. 6 is a diagram illustrating a process of transmitting a first signal to a gateway 100 by a first ECU 201 (S1401).

Referring to FIG. 6, a process (S1401) in which the first ECU 201 transmits the first signal to the gateway 100 may be confirmed in more detail. FIG. 6 is a diagram illustrating a process of transmitting the first signal to the gateway 100 by the first ECU 201 (S1401).

As shown in FIG. 6, in step S130, the first ECU 201 stores the second frame in the first temporary storage medium 2011 until the storage space of the first temporary storage medium 2011 reaches a limit value.

Thereafter, the gateway 100 may stop transmitting the second frame to the first ECU 201 (S1301), and at the same time, the gateway 100 may transmit the second frame to the second ECU 202 (S1302), and the first ECU 201 may transmit the second frame including the reprogramming data from the RAM to the flash memory (S140).

Meanwhile, step S140 may further include several processes, as shown in FIG. 5, and when the first ECU 201 moves the second frames stored in the first temporary storage medium 2011 to the first main storage medium 2012 to secure all of the storage space of the first temporary storage medium 2011, step S140 includes transmitting the first signal to the gateway 100 (S1401).

The gateway 100 may stop transmitting the second frame to the second ECU 202 by receiving the first signal (S1402) and at the same time may resume the transmission of the second frame to the first ECU 201 (S1403). In this case, the gateway 100 may exclude the second frames transmitted to the first ECU 201 before the transmission of the second frame to the first ECU 201 is stopped among the plurality of second frames, and sequentially transmit the second frames to be additionally transmitted to the first ECU 201 to the first ECU 201 again at a predetermined time interval (S1403).

That is, in the present embodiment, if the second frame is received and stored up to the allowable capacity of RAM, the gateway 100, which knows the size of the RAM and the size of the second frame in advance, is configured to no longer transmit the second data, which is the reprogramming data, until the first signal comes from the corresponding ECU 20.

Thereafter, when the gateway 100 receives the first signal, which is a message requesting that the ECU restart reprogramming, the gateway 100 retransmits the reprogramming data whose transmission has been stopped to the ECU in the form of the second frame.

Meanwhile, the ECU moves all reprogramming data from RAM to flash memory until it transmits the first signal, which is a restart message, so that the RAM prepares to receive the stopped reprogramming data.

And in the present embodiment, after the retransmission of the reprogramming data to the ECU is started, the reprogramming data is overwritten from a first address of the RAM.

And, when the ECU receives last reprogramming data, it moves all the reprogramming data remaining in the RAM to the flash memory. And, the gateway transmits the reprogramming data to another ECU.

In the device, system, and method for reprogramming the ECU according to the present disclosure, the time taken to transmit and store the reprogramming data is reduced, so that the time for reprogramming the plurality of ECUs as a whole is significantly reduced.

The present disclosure can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g. transmission over the internet). Accordingly, the above detailed description should not be construed in all aspects as limiting, and be considered illustrative. The scope of the present disclosure should be determined by rational interpretation of the appended claims, and all changes within the equivalent range of the present disclosure are included in the scope of the present disclosure.

What is claimed is:

1. A device for reprogramming an electronic control unit (ECU), comprising:
   a main node connected to a main computer configured to generate a first frame including first data for reprogramming the ECU; and
   a first sub-node connected to a first ECU comprising a first temporary storage medium and a first main storage medium,
   wherein the main node and the first sub-node are included in a gateway, the gateway being configured to:
      set a communication environment of the main node;
      receive the first frame through the main node and convert the first frame to second frames;
      sequentially transmit the second frames to the first temporary storage medium included in the first ECU at a predetermined time interval, such that the second frames are primarily stored in the first temporary storage medium of the first ECU;
      stop transmitting the second frames to the first temporary storage medium when a storage space of the first temporary storage medium is full; and
      sequentially transmit the second frames to a second temporary storage medium included in a second ECU at the predetermined time interval,
   wherein when the transmitting of the second frames is stopped, the first ECU is configured to move the second frames stored in the first temporary storage medium to the first main storage medium to secure the storage space of the first temporary storage medium until a first signal indicating that the storage space of the first temporary storage medium is secured is transmitted to the gateway by the first ECU, and
   wherein when receiving the first signal indicating that the storage space of the first temporary storage medium is secured from the first ECU, the gateway is configured to:
      stop transmitting the second frames to the second temporary storage medium,
      exclude the second frames transmitted to the first temporary storage medium before the transmission of the second frames to the first temporary storage medium is stopped, and
      sequentially transmit the second frames to be transmitted to the first temporary storage medium to the first temporary storage medium again at the predetermined time interval.

2. The device of claim 1, wherein when transmitting all the second frames to be transmitted to the first ECU, the gateway is configured to:
   resume transmission of the second frames to the second temporary storage medium,
   exclude the second frames transmitted to the second temporary storage medium before the transmission of the second frame to the second temporary storage medium is stopped, and
   sequentially transmit the second frames to be transmitted to the second temporary storage medium to the second temporary storage medium again at the predetermined time interval.

3. A system for reprogramming an electronic control unit (ECU), comprising:
   a main computer configured to generate a first frame including first data for reprogramming the ECU;
   a gateway configured to receive the first frame from a diagnostic unit and convert the first frame into second frames; and
   a plurality of ECUs configured to individually have a temporary storage medium, receive the second frames from the gateway, and primarily store them in the temporary storage medium,
   wherein each of the plurality of ECUs is configured to individually have a main storage medium,
   wherein the gateway is configured to:
      sequentially transmit the second frames to a first temporary storage medium included in a first ECU at a predetermined time interval, such that the second frames are primarily stored in the first temporary storage medium of the first ECU;
      stop transmitting the second frames to the first temporary storage medium when a storage space of the first temporary storage medium is full; and
      sequentially transmit the second frames to a second temporary storage medium included in a second ECU at the predetermined time interval, wherein when the transmitting of the second frames is stopped, the first ECU is configured to move the second frames stored in the first temporary storage medium to the main storage medium to secure the storage space of the first temporary storage medium until a first signal indicating that the storage space of the first temporary storage medium is secured is transmitted to the gateway by the first ECU, and wherein when receiving the first signal indicating that the storage space of the first temporary storage medium is secured from the first ECU, the gateway is configured to:

stop transmitting the second frames to the second ECU, exclude the second frames transmitted to the first ECU before the transmission of the second frames to the first ECU is stopped, and sequentially transmit the second frames to be transmitted to the first ECU to the first ECU again at the predetermined time interval.

4. The system of claim 3, wherein the gateway is configured to set the predetermined time interval in proportion to a capacity of the temporary storage medium divided by a predetermined size.

5. The system of claim 3, wherein the temporary storage medium is random access memory (RAM) and the main storage medium is flash memory.

6. The system of claim 3, wherein:

the plurality of ECUs include the first ECU and the second ECU, the first ECU further includes the first temporary storage medium and the main storage medium, the second ECU further includes the second temporary storage medium and a second main storage medium, and the gateway preferentially transmits the second frames to the first ECU.

7. The system of claim 6, wherein the first ECU stores the second frames received after the stop in the first temporary storage medium, and wherein when the transmission of the second frames is stopped, the second ECU moves the second frames stored in the second temporary storage medium to the second main storage medium to secure a storage space of the second temporary storage medium.

8. The system of claim 6, wherein when transmitting all the second frames to be transmitted to the first ECU, the gateway is configured to:

resume transmission of the second frames to the second ECU, exclude the second frames transmitted to the second ECU before the transmission of the second frames to the second ECU is stopped, and sequentially transmit the second frames to be transmitted to the second ECU to the second ECU again at the predetermined time interval, and wherein the second ECU stores the second frames received after the stop in the second temporary storage medium.

9. A method for reprogramming an electronic control unit (ECU) using a system for reprogramming the ECU, the method comprising:

receiving, by a gateway, a first frame from a diagnostic unit;

converting, by the gateway, the first frame into second frames;

sequentially transmitting, by the gateway, the second frames to a first ECU comprising a first temporary storage medium and a first main storage medium at a predetermined time interval;

sequentially receiving, by the first ECU, the second frames and primarily storing them in the first temporary storage medium included in the first ECU;

stopping transmitting, by the gateway, the second frames to the first temporary storage medium when a storage space of the first temporary storage medium is full; and sequentially transmitting, by the gateway, the second frames to a second temporary storage medium included in a second ECU at the predetermined time interval, wherein when the transmitting of the second frames is stopped, the first ECU is configured to move the second frames stored in the first temporary storage medium to the first main storage medium to secure the storage space of the first temporary storage medium until a first signal indicating that the storage space of the first temporary storage medium is secured is transmitted to the gateway by the first ECU, wherein when receiving the first signal indicating that the storage space of the first temporary storage medium is secured from the first ECU, the gateway is configured to:

stop transmitting the second frames to the second ECU, exclude the second frames transmitted to the first ECU before the transmission of the second frames to the first ECU is stopped, and sequentially transmit the second frames to be transmitted to the first ECU to the first ECU again at the predetermined time interval, and wherein the first frame is an Ethernet frame including first data for reprogramming the ECU, and the second frames are controller area network (CAN).

10. The method of claim 9, wherein the sequentially receiving of the second frames and primarily storing them in the first temporary storage medium by the first ECU further includes:

stopping transmitting the second frames to the first ECU by the gateway when the storage space of the first temporary storage medium for storing the second frames is insufficient; and starting transmitting the second frames to the second ECU by the gateway.

11. The method of claim 10, wherein the moving and storing the second frames stored in the first temporary storage medium to the first main storage medium by the first ECU further includes:

transmitting the first signal indicating that the storage space of the first temporary storage medium is secured to the gateway when the first ECU moves the second frames stored in the first temporary storage medium to the first main storage medium to secure all the storage space of the first temporary storage medium.

* * * * *